J. C. & W. F. CURRYER.
Plow Fender.
No. 105,047. Patented July 5, 1870.
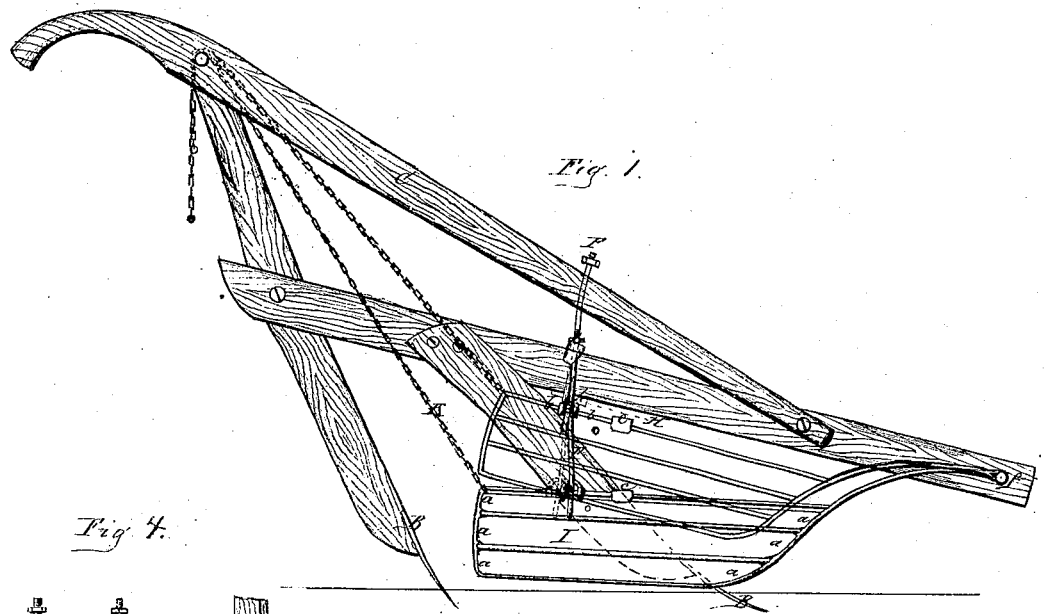
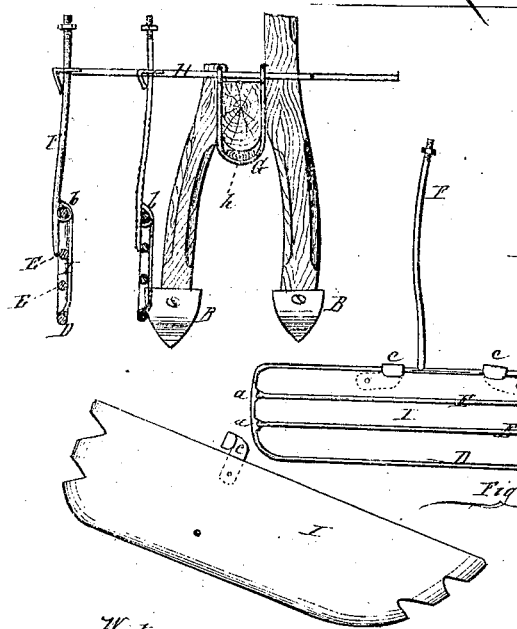
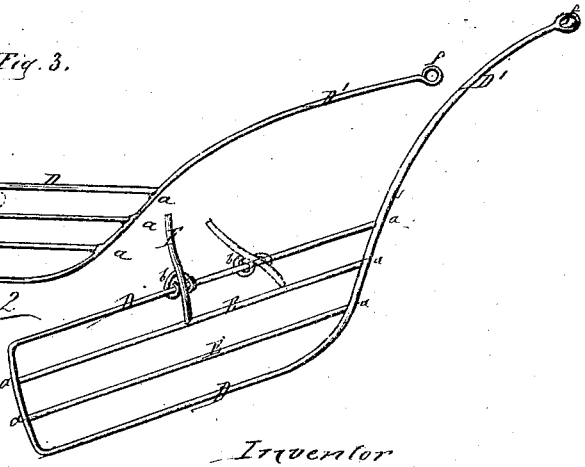
Witnesses.
Samuel Smith
H. Johnston
Inventor
J. C. & W. F. Curryer
by Alex. A. C. Klauckle & Co.
Attorneys

UNITED STATES PATENT OFFICE.

JOSEPH C. CURRYER AND WILLIAM F. CURRYER, OF THORNTOWN, INDIANA.

IMPROVEMENT IN FENDERS FOR PLOWS AND CULTIVATORS.

Specification forming part of Letters Patent No. 105,047, dated July 5, 1870; antedated June 20, 1870.

*To all whom it may concern:*

Be it known that we, J. C. CURRYER and W. F. CURRYER, of Thorntown, in the county of Boone and State of Indiana, have invented certain new and useful Improvements in Clod-Fenders or Shields for Plows or Cultivators; and we do hereby declare the following to be a full, clear, and exact description thereof, reference being had to the accompanying drawings, making part of this specification, and in which—

Figure 1 is a side elevation of a cultivator with our improved fender attached, and shown in two positions. Fig. 2 represents the fender; Fig. 3, a plan view of the same, varied in its construction; and Fig. 4, a section at line $xx$, Fig. 1.

The object of our invention is to provide a means for preventing the clods or bowlders upturned by the plowshare from falling against the growing plants—such as corn, &c.—while they are being cultivated or plowed between rows; and it consists in providing a fender or shield which is capable of being attached to a plow or cultivator and made adjustable, as will be presently explained.

We are aware that clod-fenders have before been devised for the purpose above alluded to, and that they have been applied to plows and cultivators; but many serious disadvantages exist in the construction and adaptation of all that we are familiar with, such as the impracticability of applying them to very many of the plows and cultivators in use, as they are not all made after one pattern, and necessarily differ in form and dimensions, and such differences would necessitate the manufacture of fenders especially adapted to each and every style and size of cultivator. All of these objections are overcome by our improvements, as will appear more fully by a recitation of the construction and operation; and to enable others skilled to make and use the same we will proceed to describe it, referring by letters to the drawings.

Similar letters of reference denote like parts in the different views.

A represents the beam of an ordinary cultivator, B B the points or shares, and C the handles.

The fender is composed of the frame D, extending and prolonged, as seen at D', its extremity terminating in an eye, *f*.

Between the upper and lower sides of the frame are arranged any number of rods or slats E E in parallel planes and secured at either end to the frame. The upper side or rod of the frame has attached to it a vertical rod, F, by means of grasping-claws *b b*, which encircle the upper bar of the frame, the rod proper extending down a short distance and lying against the outside of one of the intermediate bars, forming a guide and brace, as the bar through its claws *b b* slides upon the upper side of the frame D. The other end of the rod F terminates in a screw-thread and is provided with a nut. It will thus be seen that this rod is capable of adjustment longitudinally upon the frame. It is also adjustable in a vertical direction by passing through a slot formed in the rod H at its end. This rod H passes over the top of the plow-beam and through eyes in the two ends of a staple, G, which is tightened or loosened by means of a wedge, *h*, so that it may be adjusted on the plow-beam. One end of this rod H is turned down and flattened, as seen at Fig. 4, just beyond the slot through which the vertical rod F passes, so that the bent end serves as a brace to prevent the lower end of the rod and fender from springing outward from the plowshare when the weight and pressure of the clods between the share and fender tend to produce such result. The rod and fender are therefore kept always in a vertical position. The extremity D' of the frame is pivoted through the eye *f* to the forward end of the plow-beam, just behind the clevis, by a bolt, and swivels thereon. As the rod H passes through the eyes in the staples G and over the beam, it will be seen that it can be adjusted from or toward the plow by loosening the wedge *h*, and secured in any position by tightening the said wedge. The fender can therefore be adjusted from or toward the plowshare, and running as close or as far away from the growing plants as expediency may require.

The fender-frame is provided with a solid sheet-metal or other shield, which is cut away at either end, or notched, as seen at *a a*, &c. The projections and lower edge are bent slightly inward, so that they may be sprung behind the ends and bottom rail of the frame, the upper side being provided with one or more metallic clasps, c, which turn down upon the upper rail of the frame, thus securing the said shield in place, it being observed that the shield is by this means capable of being easily attached to or detached from the skeleton-frame.

A chain, rope, or strap, K, is attached to the rear end of the fender-frame and passes over the ring between the plow-handles, by means of which the plowman may, if requisite, lift the rear end of the fender and allow any obstructions which may have accumulated before it to pass under shield and out of the way, the fender assuming the proper position again as soon as released from the action of the strap. It will therefore be seen that as an entirety our improved fender is capable of adjustment in any direction when once applied, and may be by the same means attached to plows or cultivators of any pattern.

Having fully described the construction and arrangement of our improved fender, what we claim as new, and desire to secure by Letters Patent, is—

1. In combination with a fender, the rear vertical rod, F, constructed substantially as and for the purposes hereinbefore set forth.

2. In combination with the vertical rod F and the plow-beam, the horizontal adjustable rod H, staple G, and wedge h, all arranged and operating substantially in the manner and for the purpose set forth.

3. A fender or screen adaptable to plows or cultivators of varied patterns and dimensions, and capable of adjustment by and through the means hereinbefore described.

In testimony whereof we have hereunto set our hands and seals.

JOSEPH C. CURRYER. [L. S.]
WILLIAM F. CURRYER. [L. S.]

In presence of—
W. M. RIDPATH,
S. L. GOLDSBERRY.